United States Patent
Matsuda et al.

(10) Patent No.: US 7,438,740 B2
(45) Date of Patent: *Oct. 21, 2008

(54) BRIQUETTE FOR RAW MATERIAL FOR IRON MANUFACTURE AND BRIQUETTE FOR INTRODUCTION INTO SLAG GENERATING APPARATUS

(75) Inventors: Mitsuma Matsuda, Kagawa (JP); Masafumi Sedou, Hyougo (JP)

(73) Assignee: Koyo Seiko Co. Ltd., Osaka (JP)

( * ) Notice: Subject to any disclaimer, the term of this patent is extended or adjusted under 35 U.S.C. 154(b) by 380 days.

This patent is subject to a terminal disclaimer.

(21) Appl. No.: 10/795,643

(22) Filed: Mar. 8, 2004

(65) Prior Publication Data

US 2004/0194578 A1 Oct. 7, 2004

Related U.S. Application Data (63) Continuation-in-part of application No. 10/130,996, filed on Oct. 1, 2001, now Pat. No. 7,135,053, and a continuation-in-part of application No. 10/110,138, filed on Aug. 9, 2001, now abandoned.

(51) Int. Cl.
*C22B 7/00* (2006.01)
*B22F 8/00* (2006.01)

(52) U.S. Cl. ............................... 75/235; 75/246; 75/773

(58) Field of Classification Search ................ 75/316, 75/321, 235, 246, 773
See application file for complete search history.

(56) References Cited

U.S. PATENT DOCUMENTS

| | | | |
|---|---|---|---|
| 2,363,371 A | 11/1944 | Vignos | |
| 3,657,997 A | * 4/1972 | Vellella | .................. 100/39 |
| 3,905,898 A | 9/1975 | Jackson | |
| 3,960,543 A | 6/1976 | Schmalfeld et al. | |

(Continued)

FOREIGN PATENT DOCUMENTS

AU WO 94/18347 * 8/1994

(Continued)

OTHER PUBLICATIONS

English abstract of KR 2001-0010281.*

(Continued)

*Primary Examiner*—Roy King
*Assistant Examiner*—Tima M McGuthry-Banks
(74) *Attorney, Agent, or Firm*—Smith, Gambrell & Russell (57) ABSTRACT

With the object of effective utilization of a fine powder generated during comminution of a crude material for iron manufacture, a briquette is provided which comprises a porous brittle molded body with a bulk specific gravity of 1.5 or more which is obtained by compression molding a molding composition comprising a fine powder generated during comminution of a crude material for iron manufacture and a reinforcing portion for reinforcing the brittle molded body. Further, with the object of effective reuse of used alumina grinding stones, a briquette is provided which comprises a porous brittle molded body obtained by compression molding a molding composition comprising a comminuted powder of a used alumina grinding stone and a cotton-like aggregate comprising a grinding powder of a ferrous metal and a grinding liquid, and a reinforcing portion for reinforcing the brittle molded body.

7 Claims, 10 Drawing Sheets

U.S. PATENT DOCUMENTS

| | | | |
|---|---|---|---|
| 4,010,023 A * | 3/1977 | Bowden | 75/687 |
| 4,032,352 A | 6/1977 | Pietsch | |
| 5,397,379 A * | 3/1995 | Barker et al. | 75/319 |
| 5,476,532 A * | 12/1995 | Steeghs | 75/300 |
| 6,013,116 A | 1/2000 | Major et al. | |
| 6,874,411 B2 * | 4/2005 | Nakamura et al. | 100/37 |
| 7,135,053 B2 * | 11/2006 | Ishihara et al. | 75/252 |
| 2002/0152843 A1 * | 10/2002 | Ishihara et al. | 75/316 |
| 2003/0075014 A1 * | 4/2003 | Ishihara et al. | 75/232 |

FOREIGN PATENT DOCUMENTS

| | | | |
|---|---|---|---|
| EP | 0 329 281 A2 | | 8/1989 |
| GB | 1069317 | * | 5/1967 |
| JP | 62-086128 | | 4/1987 |
| JP | 2001105188 A | * | 4/2001 |
| JP | 2001-220621 | * | 8/2001 |
| JP | 2002-121625 | | 4/2002 |
| KR | 2001-0010281 | * | 2/2001 |

OTHER PUBLICATIONS

Machine translation of JP 2002-121625.*
Machine translation of JP 2001-220621.*
Khoroshavin, L. B. et al., "Metallurgical Briquets: New Products of Refractory Industry," Ogneupory I Tekhnicheskaya Keramika, 2002, pp. 49-50, No. 7-8, Engineering Information, Inc., New York, New York (Database Compendex/EI [Online], Database Accession No. E2003047335854 XP002286323, abstract).

* cited by examiner

BRIQUETTE FOR RAW MATERIAL FOR IRON MANUFACTURE AND BRIQUETTE FOR INTRODUCTION INTO SLAG GENERATING APPARATUS

REFERENCE TO RELATED APPLICATIONS

This application is a continuation-in-part of applications Ser. No. 10/110,138 filed Aug. 9, 2001 now abandoned, and Ser. No. 10/130,996 filed Oct. 1, 2001 and now U.S. Pat. No. 7,135,053, which are both relied on and incorporated herein by reference.

BACKGROUND OF THE INVENTION

1. Field of the Invention

The present invention relates to a briquette using industrial wastes. More specifically, the present invention relates to a briquette for a raw material for iron manufacture that can effectively use a fine powder generated during comminution of crude materials for iron manufacture such as manganese ores, or to a briquette for introduction into a slag generating apparatus that can effectively reuse a comminuted powder of alumina ($Al_2O_3$) grinding stones obtained in comminuting the used alumina grinding stones.

2. Description of the Related Art

A variety of technologies relating to reuse of wastes in iron manufacturing industry (used hereinbelow as a general concept enclosing pig iron manufacture and steelmaking) have been suggested toward the realization of a recycling-oriented society. For example, a technology has been suggested for briquetting cotton-like (fibrous) aggregates comprising powders, oil and water that are generated during grinding (used hereinbelow as a general concept enclosing polishing, ultrafinish polishing, lapping, and the like) of ferrous metals such as bearing steels or carburized steels and reusing them as raw materials for steelmaking (for example, Japanese Patent Application Laid-open Nos. 2002-129248 and 2001-310259).

The aforesaid suggested technologies can effectively reuse grinding powders of ferrous metals that have been heretofore processed as wastes, but a lot of materials are still processed as wastes in the iron manufacturing industry. Examples thereof include fine powders of manganese ores or used alumina grinding stones.

Manganese ores are used to increase rolling ability in manufacturing spring steels or high-strength thin steel sheets (for automobiles or the like) and usually manganese ores are introduced into a converter after comminuting to 50 $mm^3$ or less. However, a fine powder with a size of 10 $mm^3$ or less that is generated during such comminution is scattered inside the furnace and whirled up. For this reason, at present, this fine powder is recovered with a dust collector and used, for example, as an inexpensive coke in blast furnaces or is directly processed as wastes. For this reason, it is desirable to develop a technology capable of effectively using fine powders with a small particle size, that requires no waste treatment.

On the other hand, alumina grinding stones are mounted on various grinding apparatuses and used, e.g., for polishing cast iron and steel. However, alumina grinding stones that have been fully used are usually recovered by the manufacturer, entrusted to waste treatment specialists, and buried. Accordingly is desirable, from the standpoint of environmental protection and effective utilization of resources, to develop a technology for reusing the used alumina grinding stones.

With the foregoing in view, it is an object of the present invention to provide briquettes for raw materials for iron manufacture that can effectively use fine powders generated in comminuting the crude materials for iron manufacture and briquettes for introduction into slag generating apparatus that can effectively reuse the used alumina grinding stones.

SUMMARY OF THE INVENTION (Briquette for Raw Material for Iron Manufacture)

The inventors have conducted a comprehensive study aimed at effective utilization of fine powders with a small particle size among various industrial wastes, in particular, the fraction that was separated from comminuted manganese ore introduced into a converter. In this process, it was investigated whether it is possible to recover a fine powder with a small particle size and to use it by forming a solid body with prescribed dimensions and introducing it into a converter or the like. As a result, it was found that if, instead of forming a fine powder with a small particle size into a solid body with prescribed dimensions, a fine powder generated during comminution of the crude materials for iron manufacture such as manganese ores is compression molded to obtain a porous brittle molded body with a bulk specific gravity of 1.5 or more, preferably 2.5 or more, and this molded body is strengthened with a solidification adjuvant or the like, then it can be effectively used as a raw material for iron manufacture, without such inconveniences as scattering and whirling inside the furnace such as a converter. This finding led to the creation of the present invention.

Thus, a briquette for a raw material for iron manufacture in accordance with the present invention comprises a porous brittle molded body with a bulk specific gravity of 1.5 or more which is obtained by compression molding a molding composition comprising a fine powder generated during comminution of a crude material for iron manufacture and a reinforcing portion for reinforcing the brittle molded body.

With the above-described configuration, because the porous brittle molded body with a bulk specific gravity of 1.5 or more is reinforced with the reinforcing portion, the prescribed strength and shape retention ability are ensured. For this reason, the briquette can be effective used as a raw material for iron manufacture which is to be introduced into a converter or blast furnace. Furthermore, because a material is used that has been conventionally processed as a waste, this is advantageous from the standpoint of effective utilization of resources and environmental protection.

In the above-described briquette for a raw material for iron manufacture, the reinforcing portion is preferably in the form of a reinforcing layer formed in a layered manner on at least one location of under the surface and on the surface of the brittle molded body. In this case, even if the brittle molded body is cracked by impacts during transportation or the like, a complete collapse of the body is prevented by the aforesaid reinforcing layer, thereby providing for even better shape retention ability.

In accordance with the present invention, the expression "on at least one of under the surface and on the surface of the brittle molded body" includes the case in which the reinforcing layer is formed on the inner side (under the surface) of the brittle molded body, with the surface of the brittle molded body serving as a boundary, the case in which the reinforcing layer is formed on the outer side (on the surface), and the case in which the reinforcing layer is formed both on the inner side (under the surface) and on the outer side (on the surface).

In the briquette for a raw material for iron manufacture, the aforesaid fine powder generated during comminution of the crude material for iron manufacture is preferably a fine powder with a particle size of 10 mm³ or less. Because such fine powders have been mainly treated as wastes, the use thereof is especially advantageous from the standpoint of effective use of resources and environmental protection.

In the briquette for a raw material for iron manufacture, the fine powder generated during comminution of the crude material for iron manufacture is preferably a fine powder generated during comminution of manganese ores. In this case, the fine powder of manganese ores which is difficult to handle is processed so that the prescribed strength and shape retention ability are ensured. Therefore, it can be effectively used instead of the comminuted manganese ores introduced into converters or the like or together with the comminuted manganese ores. For example, in the manufacture of high-strength thin steel sheets used for automobiles or the like, manganese has been used to replace carbon with the object of improving rolling ability. Therefore, the aforesaid briquette can be effectively used in the manufacture of such thin steel sheets.

In the briquette for a raw material for iron manufacture, the aforesaid brittle molded body preferably additionally contains a grinding powder of a ferrous metal. In this case, a porous brittle molded body with a bulk specific gravity of 1.5 or more can be easily manufactured and a reinforcing portion (reinforcing layer) can be easily formed. Furthermore, a grinding powder of a ferrous metal contains a large quantity of pure iron and are, therefore, preferred for raw materials for iron manufacture. In addition to the aforesaid grinding powder, polishing dust can be also used.

In the aforesaid briquette for a raw material for iron manufacture, the brittle molded body preferably further contains a collected dust. Briquetting can be conducted despite the inclusion of collected dust, and the inclusion of the collected dust that has been conventionally treated as a waste makes the briquette even more advantageous in terms of effective utilization of resources and environmental protection.

In the aforesaid briquette for a raw material for iron manufacture, the brittle molded body preferably further contains a synthetic resin powder. Briquetting can be conducted despite the inclusion of a synthetic resin powder, and the advantage of including such a synthetic resin powder is that the resin can play a role of a reducing agent or the like.

In the aforesaid briquette for a raw material for iron manufacture, the reinforcing portion preferably comprises a solidification adjuvant. In this case the reinforcing portion (reinforcing layer) can be formed in a simple manner and a briquette with a high shape retention ability is obtained.

In the aforesaid briquette for a raw material for iron manufacture, the solidification adjuvant is preferably at least one selected from a group including colloidal silica, sodium silicate, aluminum phosphate and asphalt emulsion. In this case, the reinforcing portion (reinforcing layer) can be formed in a simple manner and reliably and a briquette with a high shape retention ability is obtained. Further, a pulp sludge which is discarded in the papermaking plants may be also used. The pulp sludge can increase the shape retention ability and allows the reinforcing portion to be formed in a simple manner and reliably.

In the aforesaid briquette for a raw material for iron manufacture, the content ratio of the solidification adjuvant is preferably set within a range of 2 to 30 wt. %. In this case, a briquette with a high shape retention ability is obtained.

In addition, auxiliary resources for iron manufacture such as slaked lime or coke can be also admixed appropriately (Briquette for Introduction into Slag Generating Apparatus)

The inventors have also conducted a comprehensive study aimed at effective reuse, in particular, of wasted alumina grinding stones as industrial wastes. In this process the attention was focused on utilization of agents for improving slag flowability or calming agents for blast furnaces, that contain alumina as the main component, the equipment for slag generation such as blast furnaces, and the possibility of using used alumina grinding stones was investigated. As a result, it was found that if, instead of simply forming a comminuted powder of used alumina grinding stones into a solid body with prescribed dimensions, a molding composition is used which comprises a comminuted powder of used alumina grinding stones and a cotton-like aggregate comprising a grinding powder of a ferrous metal and a grinding liquid, this molding composition is compression molded to give a brittle molded body, and the brittle molded body is reinforced by using a solidification adjuvant, then the product obtained can be used instead of the conventional agents for improving slag flowability or calming agents for blast furnaces or together therewith.

Thus, the briquette for introduction into a slag generating apparatus in accordance with the present invention comprises a porous brittle molded body which is obtained by compression molding a molding composition comprising the below-described components (a) and (b) and a reinforcing portion for reinforcing the brittle molded body.

(a) A comminuted powder of a used alumina grinding stone.

(b) A cotton-like aggregate comprising a grinding powder of a ferrous metal and a grinding liquid.

With the above-described constituent features, the comminuted powder of wasted alumina grinding stones is used together with the cotton-like aggregate comprising a grinding powder of a ferrous metal and a grinding liquid and a reinforcing portion is formed. Therefore, the prescribed strength and shape retention ability are ensured. Furthermore, because a comminuted powder obtained by comminuting the used alumina grinding stones is used, if the briquette is used by being introduced into apparatuses of different types for slag generation, good slag flowability is obtained. Therefore, a briquette capable of effectively using the used alumina grinding stones is obtained.

In the present specification, the term "slag generating apparatus" is a general term for apparatuses of a variety of types for slag generation, such as blast furnaces, and includes all the apparatuses into which the conventional agents for improving slag flowability or calming agents for blast furnaces have been introduced.

In the above-described briquette for a slag generating apparatus, the aforesaid reinforcing portion is preferably in the form of a reinforcing layer formed in a layered manner on at least one location of under the surface and on the surface of the brittle molded body. If a layer-like reinforcing layer is provided under the surface and on the surface of the brittle molded body which is at risk of being collapsed, the collapse of the molded body is effectively prevented even if the brittle molded body is cracked by impacts during transportation or the like, thereby providing for even better shape retention ability.

In accordance with the present invention, the expression "on at least one location of under the surface and on the surface of the brittle molded body" includes the case in which the reinforcing layer is formed on the inner side (under the surface) of the brittle molded body, with the surface of the brittle molded body serving as a boundary, the case in which the reinforcing layer is formed on the outer side (on the surface), and the case in which the reinforcing layer is formed both on the inner side (under the surface) and on the outer side (on the surface).

In the aforesaid briquette for a slag generating apparatus, the reinforcing portion preferably comprises a solidification adjuvant. In this case the reinforcing portion (reinforcing layer) can be formed in a simple manner and a briquette with a high shape retention ability is obtained.

In the aforesaid briquette for a slag generating apparatus, the solidification adjuvant is preferably at least one selected from a group including colloidal silica, sodium silicate, aluminum phosphate and asphalt emulsion. In this case, the reinforcing portion (reinforcing layer) can be formed in a simple manner and reliably and a briquette with a high shape retention ability is obtained.

In the aforesaid briquette for a slag generating apparatus, the solidification adjuvant preferably comprises pulp sludge. In this case, the reinforcing portion (reinforcing layer) can be formed in a simple manner and reliably and a briquette with a high shape retention ability is obtained. Furthermore, because a pulp sludge is used which is a waste of papermaking plants, the briquette is further improved in terms of effective use of resources and environmental protection.

In the aforesaid briquette for a raw material for iron manufacture, the content ratio of the grinding powder of the ferrous metal is preferably set within a range of 1 to 60 wt. %, more preferably within a range of 40 to 50 wt. %. In this case a large amount of comminuted powder of alumina grinding stones can be used and the prescribed shape is maintained.

DESCRIPTION OF THE PREFERRED EMBODIMENTS

The preferred embodiments of the briquettes in accordance with the present invention will be described separately for the briquette for a raw material for iron manufacture that uses fine powders generated during comminution of a crude material for iron manufacture, which is a waste, and the briquette for introduction into a slag generating apparatus that uses the comminuted powder of used alumina grinding stones which are a waste.

(Briquette for a Raw Material for Iron Manufacture)

Figure 1:
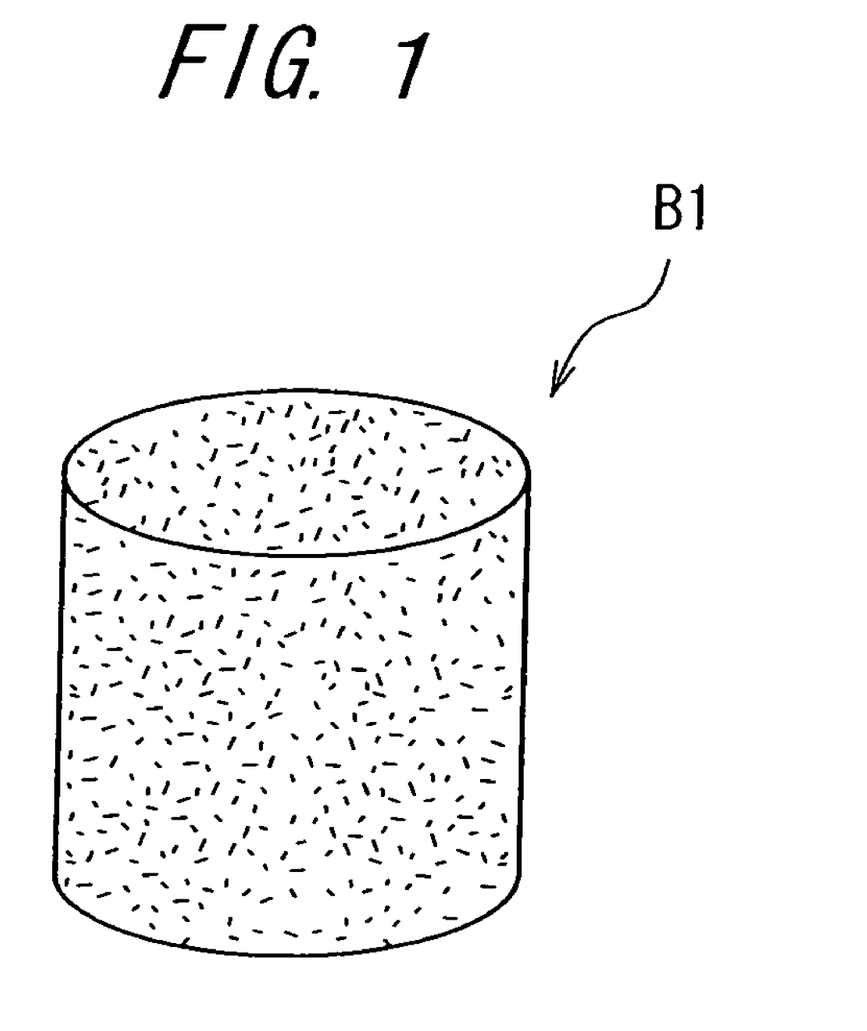
FIG. 1 is a perspective view illustrating an embodiment of the briquette for a raw material for iron manufacture in accordance with the present invention.
Figure 2:
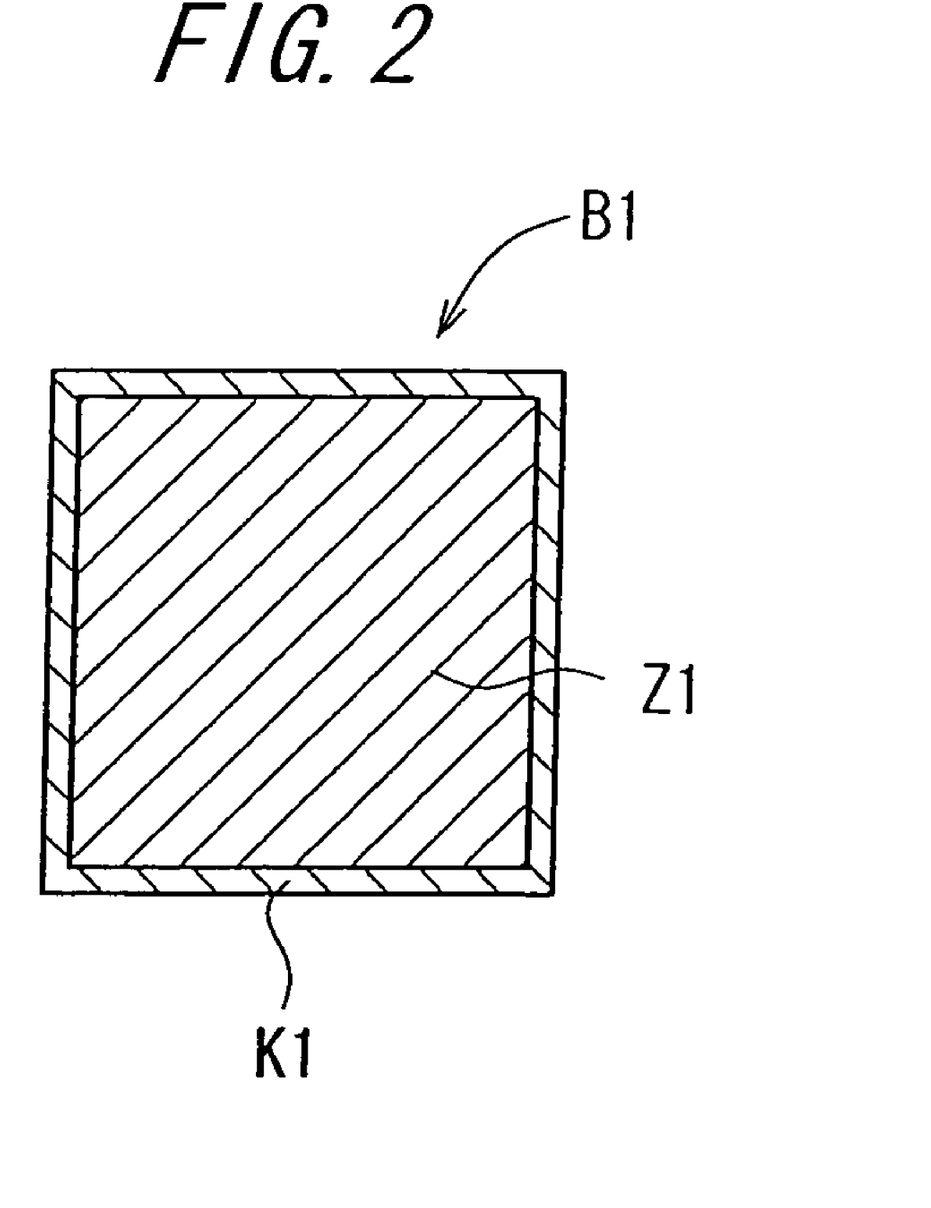
FIG. 2 is a cross sectional view of the briquette for a raw material for iron manufacture shown in FIG. 1.

FIG. 1 is a perspective view illustrating an embodiment of the briquette for a raw material for iron manufacture in accordance with the present invention. FIG. 2 is a cross-sectional view thereof. The briquette B1 of the present embodiment is composed of a porous brittle molded body Z1 which as a whole has a round columnar shape and a reinforcing layer K1 serving as a reinforcing portion formed under the surface (inside) thereof.

The brittle molded body Z1 is obtained by compression molding a molding composition comprising a fine powder generated during comminution of a crude material for iron manufacture, a cotton-like (fibrous) aggregate comprising grinding powders generated by grinding of ferrous metals and a grinding liquid comprising an oil fraction and a water fraction, collected dust, and a synthetic resin powder, the compression molding being conducted so that the molded body has a round columnar shape and a bulk specific gravity of 1.5 or more, preferably within a range of 2.0 to 5.0. This brittle molded body Z1 is composed as a porous brittle body having appropriate cavities.

For example, a manganese ore is used as a crude material for iron manufacture. The fine powder generated during comminution of the crude material for iron manufacture preferably has a particle size of 10 $mm^3$ or less. Prior to introduction of the manganese ore into a converter or the like, the ore is comminuted to 50 $mm^3$ or less, but a powder with a size of 10 $mm^3$ or less that is generated in this process is advantageously used. Such a fine powder can be readily obtained by classifying the comminuted manganese ore, for example with a sieve, prior to introduction into the furnace. The content ratio of the fine powder generated during comminution of the crude material for iron manufacture is preferably set within a range of 50 to 95 wt. %, more preferably to 80 to 95 wt. % based on the entire composition of the molding prior to compression molding.

A ferrous metal with a carbon content of 0.2 wt. % or higher can be used as the aforesaid ferrous metal. Grinding powders of such a ferrous metal have a large springback and are difficult to solidify. However, employing compression molding makes it possible to eliminate the effect of springback during compression molding and effectively shear the grinding powders, thereby enabling solidification. Grinding powders of bearing steels represent an example of grinding powders containing not less than 0.2 wt. % carbon. The content ratio of grinding powders of a ferrous metal is preferably set within a range of 5 to 50 wt. %, more preferably 5 to 20 wt. % based on the entire composition of the molding prior to compression molding.

The aforesaid collection duct is recovered with a dust collector mounted on a blast furnace, converter, or the like, and comprises both the dust collected during pig iron manufacture and the dust collected during steelmaking. Using such a collected dust also provides a briquette with the prescribed strength and shape retention ability. Because a large quantity of collected dust has also been treated as a waste, employing the collected dust is preferred from the standpoint of effective utilization of resources and environmental protection. The content ratio of the collected dust is preferably set within a range of 5 to 50 wt. %, more preferably 5 to 20 wt. % based on the entire composition of the molding prior to compression molding.

Examples of synthetic resin powders include powders of various types, for example, polypropylene and polyethylene. The synthetic resin may be newly synthesized from monomers or may be a waste. The content ratio of the synthetic resin powder is preferably set within a range of 5 to 30 wt. %, more preferably 5 to 10 wt. % based on the entire composition of the molding prior to compression molding.

The reinforcing layer K1 is formed in a layered manner with a strength and density higher than that of the inner portions (brittle molded body Z1) of the briquette B1. The reinforcing layer K1 can be formed, for example, by mixing prior to molding, or dipping in a liquid solidification adjuvant, or applying (coating) a liquid solidification adjuvant, followed by drying. Colloidal silica, sodium silicate, aluminum phosphate and asphalt emulsion are preferably used as the solidification adjuvant. Using those materials makes it possible to obtain a strong briquette B1 despite the presence of a fine powder generated during comminution of a crude material for iron manufacture or oil derived from the grinding liquid. The aforesaid solidification adjuvants can be used individually or in combination of two or more thereof. The solidification adjuvant is preferably used at a ratio of 2 to 30 wt. % based on the entire briquette B1.

Figure 3:
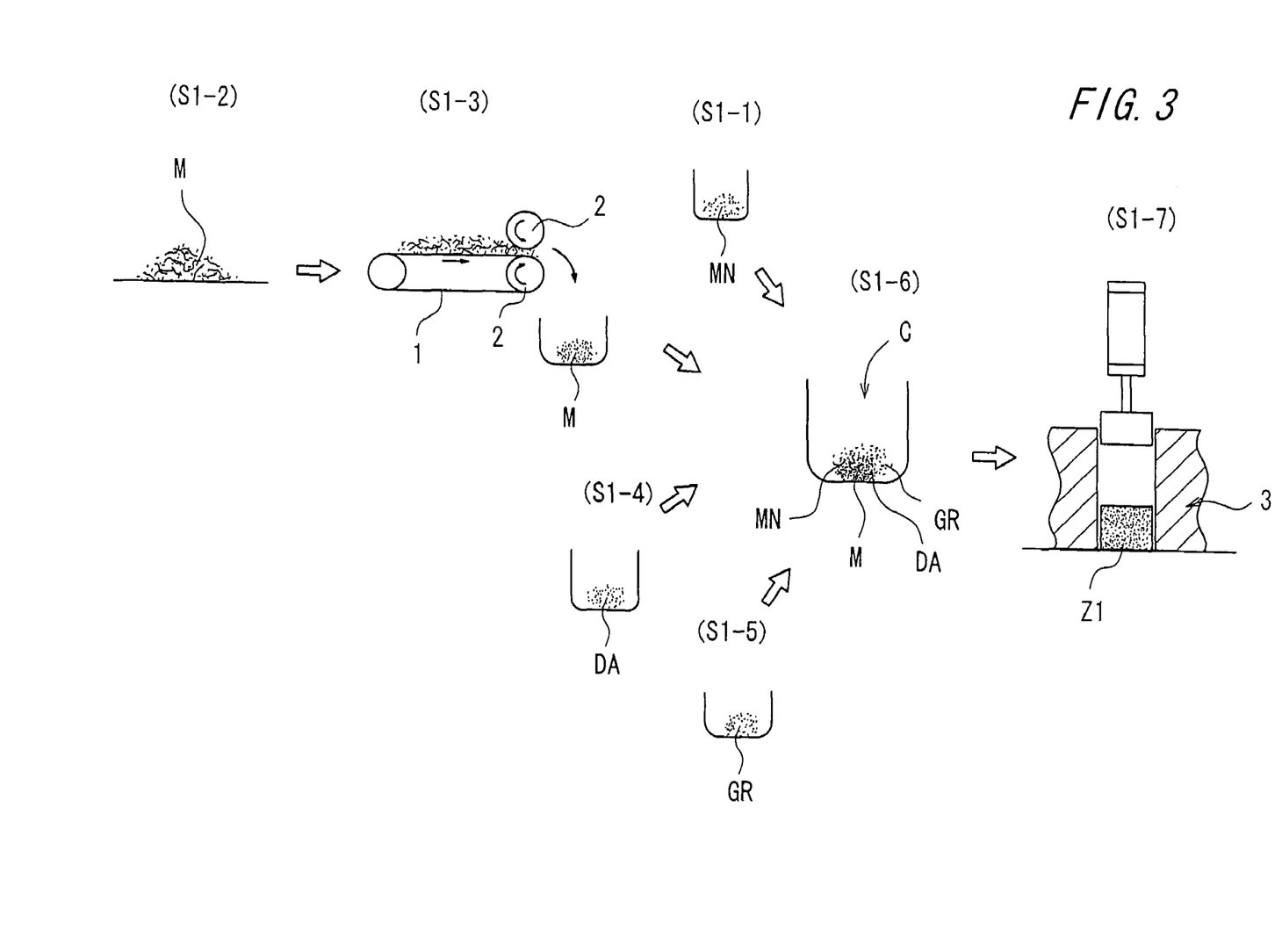
FIG. 3 is a process diagram illustrating schematically the process (before compression molding) for the manufacture of the briquette for a raw material for iron manufacture shown in FIG. 1.

The briquette B1 of the present embodiment can be manufactured, for example, in the manner as follows. The explanation hereinbelow will be conducted with respect to the case in which a fine powder (10 mm$^3$ or less) of a manganese ore is used as the fine powder generated during comminution of a crude material for iron manufacture. Thus, first, as shown in FIG. 3, a fine powder MN of manganese ore is prepared by classification with a sieve and the like and recovery from a comminuted powder of manganese ore (see S1-1 in the figure). Then, cotton-like aggregates M comprising grinding powders of a ferrous metal and a grinding liquid (see S1-2) in the figure) are pressurized and compressed by passing between a pair of rolls 2, while being transported on a belt conveyor 1 (see S1-3 in the figure), thereby preliminary adjusting the content of water and oil which are the components of the grinding liquid contained in the cotton-like aggregates M. However, this adjustment of oil and water content can be also carried out by simple air blowing or air compression. In this process, the content ratio of water in the cotton-like aggregate M is preferably adjusted to a range of not more than 50 wt. % and the content ratio of oil is adjusted to a range of not more than 10 wt. %. As a result, the cotton-like aggregate M can be easily handled, e.g., transported and stored. Furthermore, the content ratio of powder-like collected duct DA (see S1-4) in the figure or synthetic resin powder GR (see S1-5) in the figure is also adjusted.

The fine powder MN of manganese ore, cotton-like aggregates M, collected dust DA, and synthetic resin powder GR are then mixed at the prescribed ratio to obtain a mixture C as a molding composition (see S1-6 in the figure).

The mixture C thus obtained is then compression molded with a hydraulic press by using a mold 3 and a brittle molded body Z1 is obtained (see S1-7 in the figure). In this process, the cotton-like aggregates M are compressed so that the bulk specific gravity of the brittle molded body Z1 becomes 1.5 or higher. As a result of this compression molding, the grinding powders in the form of spiral fibers that are contained in the cotton-like aggregates M are subjected to shear deformation, and the fine powder MN of manganese ore, powder-like collected dust DA, and synthetic resin powder GR are introduced in the gaps between the sheared grinding powders.

Figure 4:
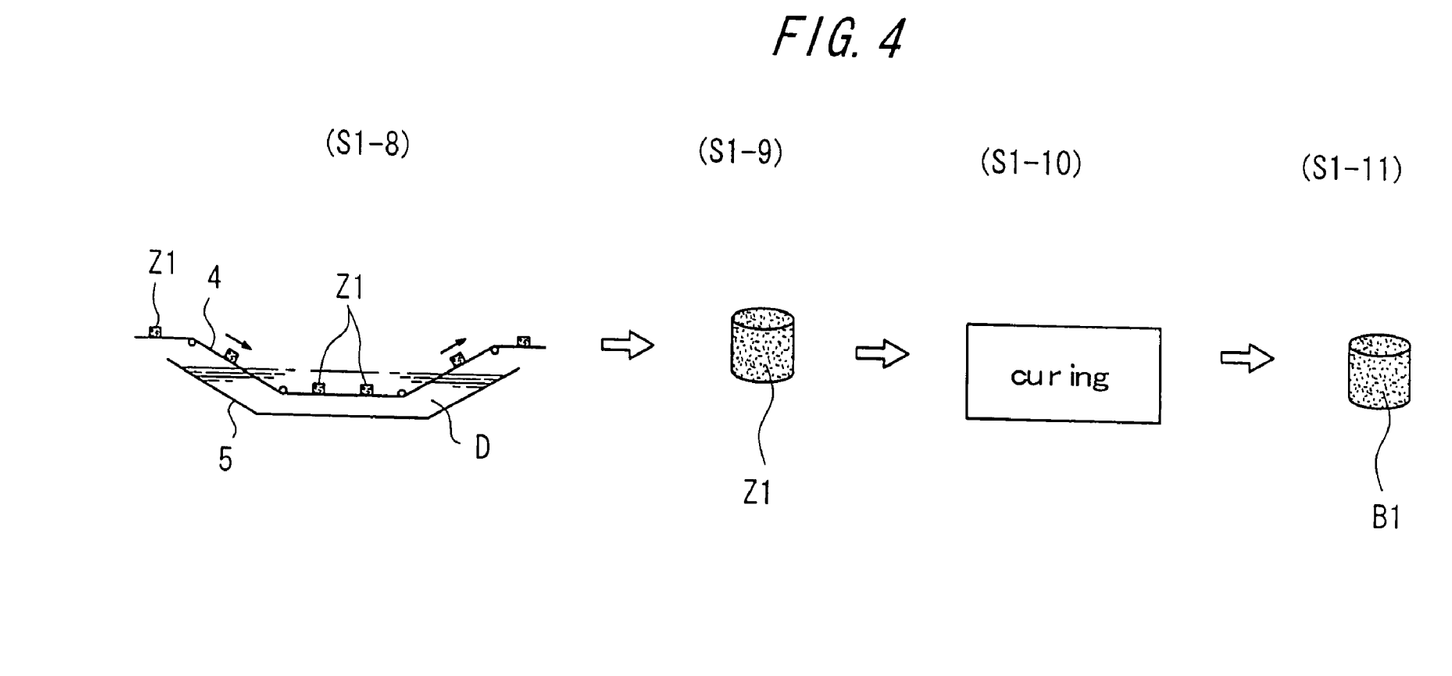
FIG. 4 is a process diagram illustrating schematically the process (after compression molding) for the manufacture of the briquette for a raw material for iron manufacture shown in FIG. 1.

Then, as shown in FIG. 4, the brittle molded body Z1 thus obtained is immersed in a liquid solidification adjuvant D that was poured in a tank 8, while being slowly transported on a belt conveyor 4, so as to prevent the brittle molded body from crushing (see S1-8 in the figure). Instead of transporting on the conveyor, the brittle molded body Z1 may be accommodated in a pallet or the like and immersed in the liquid solidification adjuvant D in a batch mode.

A briquette B1 can be then obtained (see S1-11 in the figure) by curing (drying) (see S1-10 in the figure) the brittle molded body Z1 (see S1-9 in the figure) impregnated with the solidification adjuvant D. As a result of the curing, excess solidification adjuvant that penetrated into the brittle molded body Z1 migrates to the surface and is partly evaporated. The rest of the solidification adjuvant remains on the surface of the brittle molded body Z1, thereby forming a reinforcing layer K1 that makes a strength and density on the surface higher than those inside. The target briquette B1 is thus obtained.

The briquette B1 of the present invention that was thus obtained uses a fine powder generated during comminution of a manganese ore serving as a crude material for iron manufacture. Therefore, it can be introduced into the furnace instead of the comminuted manganese ore, which is introduced as an auxiliary raw material during iron manufacture, or together with the comminuted manganese ore. Therefore, the fine powder of manganese ore can be used effectively and the necessity of waste treatment of a large amount of such powders is eliminated. As a result, environment is protected. Furthermore, because a dried solid substance of prescribed dimensions (for example, round columns with a diameter of 60 to 70 mm and a height of 30 to 40 mm) is obtained, scattering and whirling inside a furnace such as a converter is suppressed. Furthermore, in the briquette B1 of the present embodiment, the porous brittle molded body Z1 with a bulk specific gravity of 1.5 or more, preferably 2.5 or more is reinforced with a layer-like reinforcing layer K1, the prescribed strength and shape retention ability are ensured. Moreover, a fine powder of a manganese ore is very difficult to handle, and another advantage of the above-described briquette is that it improves handleability. The inventors have confirmed that the briquette B1 comprising a brittle molded body obtained by compression molding a molding composition comprising 80 wt. % fine powder (10 mm$^3$ or less) of a manganese ore and 20 wt. % cotton-like aggregate comprising grinding powders of a ferrous metal and a grinding liquid and a reinforcing layer formed under the surface of the brittle molded body by using sodium silicate as a solidification adjuvant has a strength and shape retention ability sufficient for usage as a raw material for iron manufacture.

In addition to the aforesaid round columnar shape, the briquette for a raw material for iron manufacture in accordance with the present invention may have a shape with rounded edges, such as egg-like, almond-like, or rugby ball-like shape or a pillow-like shape in which the thickness gradually increases from the edges to the center. Molding to such a shape increases the resistance to a compression load, crushing, and partial fracture in the corner portions.

The briquette for a raw material for iron manufacture in accordance with the present invention is not limited to a configuration in which the reinforcing layer K1 is formed under the surface of the porous brittle molded body Z1. For example, a reinforcing layer extending from under to over the surface of the brittle molded body Z1 may be also formed, for example, by applying (coating) a solidification adjuvant having a high viscosity on the surface of the brittle molded body Z1, thereby reducing the degree of permeation into the porous brittle molded body Z1. Furthermore, a reinforcing layer may be formed on the surface of the brittle molded body Z1 by using a solidification adjuvant with even higher viscosity and substantially eliminating the permeation into the porous brittle molded body Z1. Such briquettes, too, can be effectively used as raw materials for iron manufactured.

Figure 5:
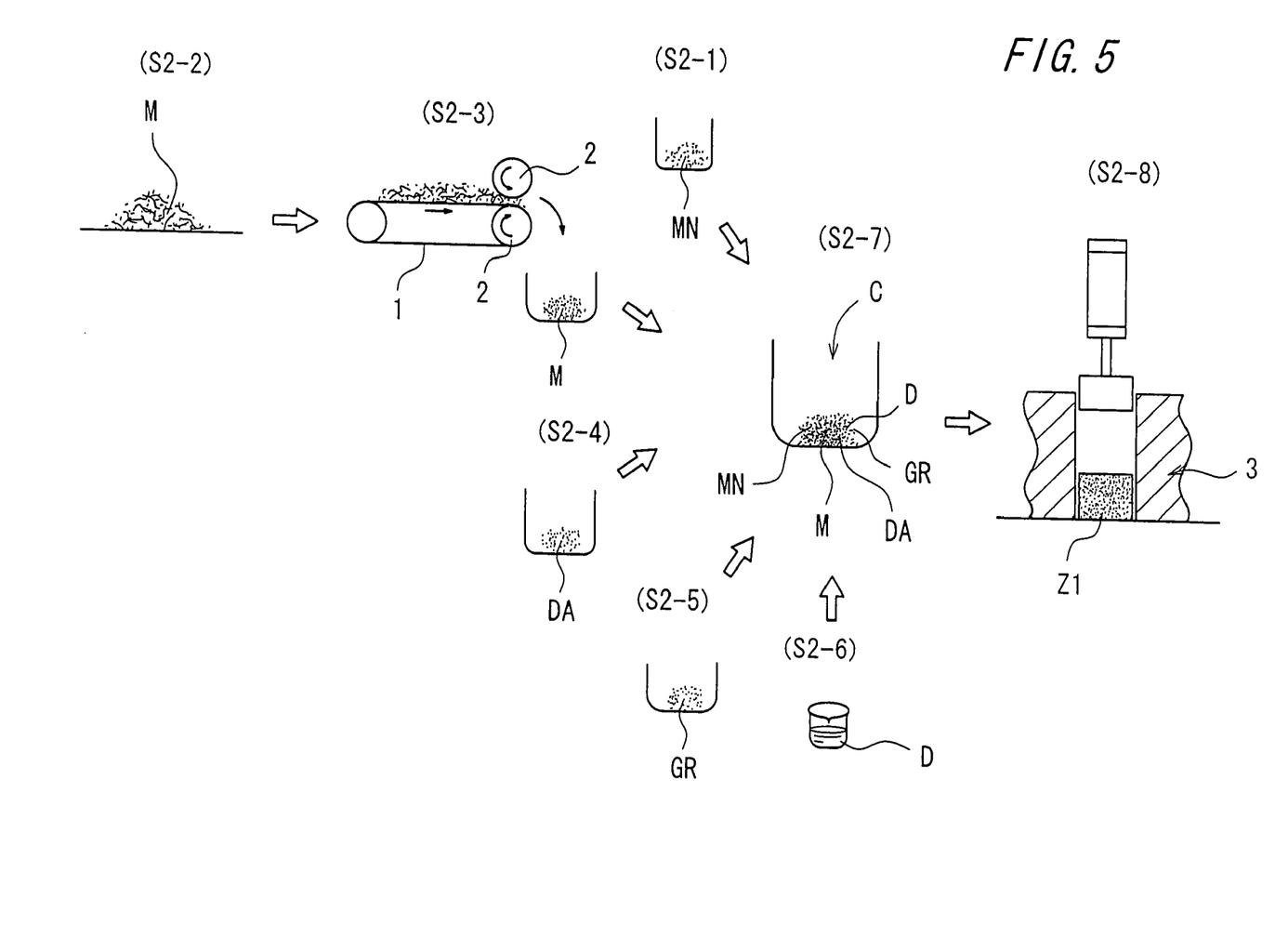
FIG. 5 is a process diagram illustrating schematically another method (before compression molding) for the manufacture of the briquette for a raw material for iron manufacture in accordance with the present invention.
Figure 6:
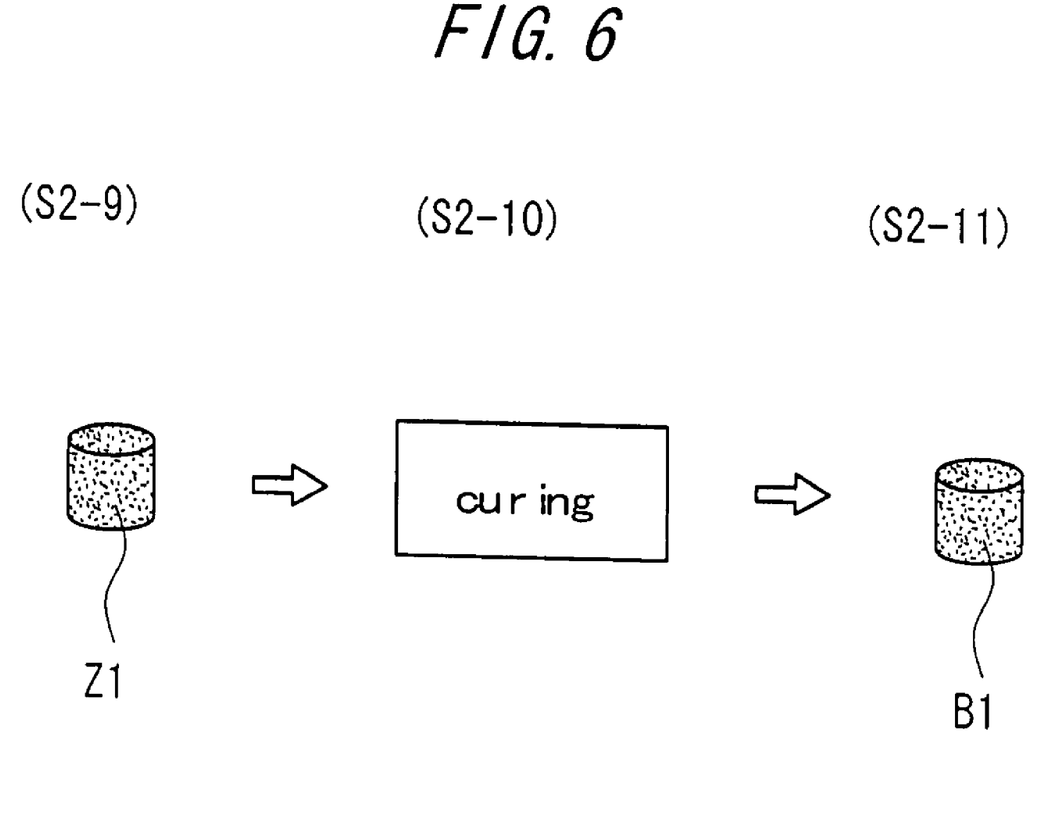
FIG. 6 is a process diagram illustrating schematically another method (after compression molding) for the manufacture of the briquette for a raw material for iron manufacture in accordance with the present invention.

FIGS. 5 and 6 are the process diagrams illustrating schematically another method for the manufacture of the briquette for a raw material for iron manufacture in accordance with the present invention. The difference between the method for manufacture of briquettes of the present embodiment and the method of the above-described embodiment (see FIGS. 3 and 4) is in that a liquid solidification adjuvant is mixed in advance (see S2-7 in FIG. 5) with the molding composition (see S2-6 shown in FIG. 5), and the resulting molding composition is compression molded and then cured (dried). In this case, a state is assumed in which the solidified solidification adjuvant that remained in the brittle molded body is distributed appropriately and becomes a reinforcing portion for reinforcing the brittle molded body. Such a briquette, similarly to the above-described briquettes, can be used for introduction into a furnace during iron manufacture. Therefore, a contribution is made to effective utilization of resources and environmental protection. Another advantage is that because the step of immersing the brittle molded body Z1 into the solidification adjuvant D (see S1-8 in FIG. 4) becomes unnecessary, the manufacturing equipment can be simplified.

The explanation hereinabove was conducted with respect to the case in which a molding composition was used that comprised a cotton-like aggregate containing grinding powders of a ferrous metal and a grinding liquid, collected dust, and a synthetic resin powder in addition to the fine powder of a manganese ores as a fine powder generated during comminution of crude materials for iron manufacture. However, the present invention is not limited to such an implementation. For example, a molding composition comprising a fine powder of a manganese ore as a crude material for iron manufacture, collected dust, and a synthetic resin powder (composition containing no cotton-like aggregate) may be also used. Thus, a briquette may also comprise a porous brittle molded body with a bulk specific gravity of 1.5 or more that is obtained by compression molding a molding composition comprising a fine powder generated during comminution of a manganese ore, collected dust, and a synthetic resin powder and a reinforcing portion for reinforcing this brittle molded body. Such a briquette can be also introduced into a melting furnace as an auxiliary raw material for iron manufacture. In this briquette, too, the fine powder of manganese ore preferably has a particle size of 10 mm$^3$ or less. Furthermore, the content ratio of the fine powder of manganese ore is preferably set within a range of 20 to 80 wt. % based on the entire molding composition. The content ratio of collected dust is preferably set within a range of 20 to 80 wt. %. The content ratio of the synthetic resin powder is preferably set within a range of 5 to 30 wt. % based on the entire molding composition. Such a briquette using no cotton-like aggregate can be also introduced into a furnace as a raw material for iron manufacture, similarly to the above-described briquettes. Therefore, a contribution is made to effective utilization of resources and environmental protection. Further, it goes without saying that the briquette in accordance with the present invention may contain no collected dust or synthetic resin powder described hereinabove.

(Briquette for Introduction into a Slag Generating Apparatus)

Figure 7:
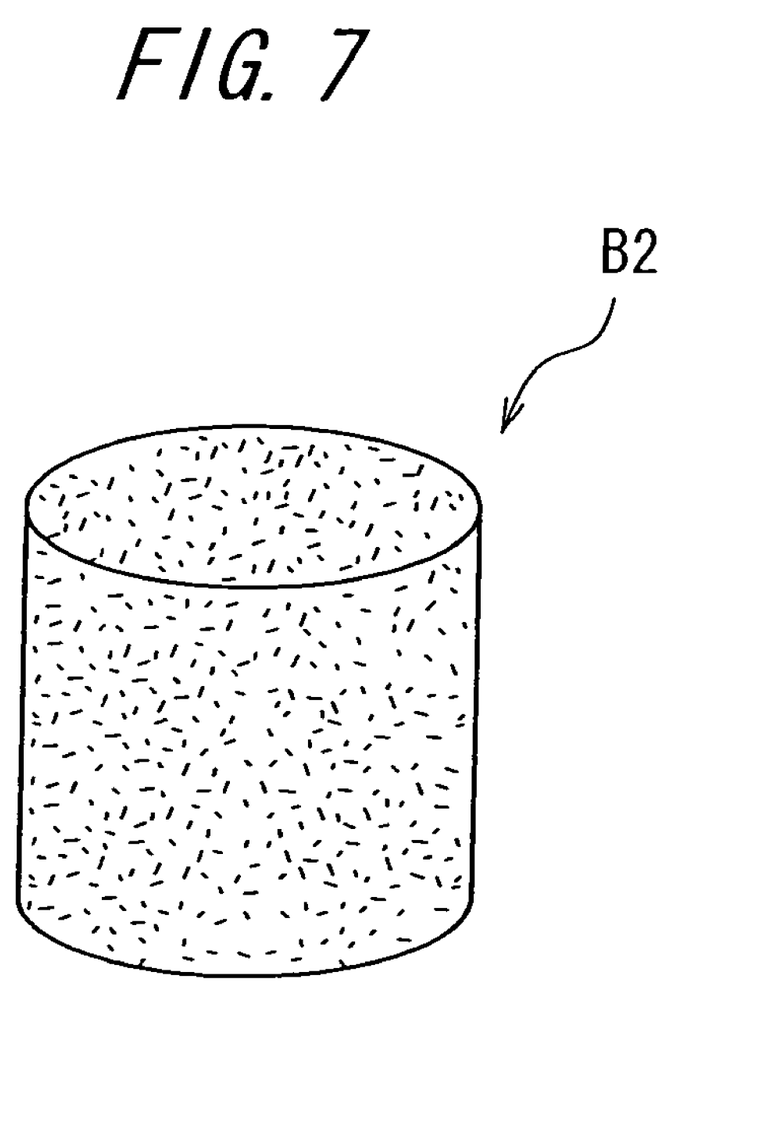
FIG. 7 is a perspective view illustrating an embodiment of the briquette for introduction into a slag generating apparatus in accordance with the present invention.
Figure 8:
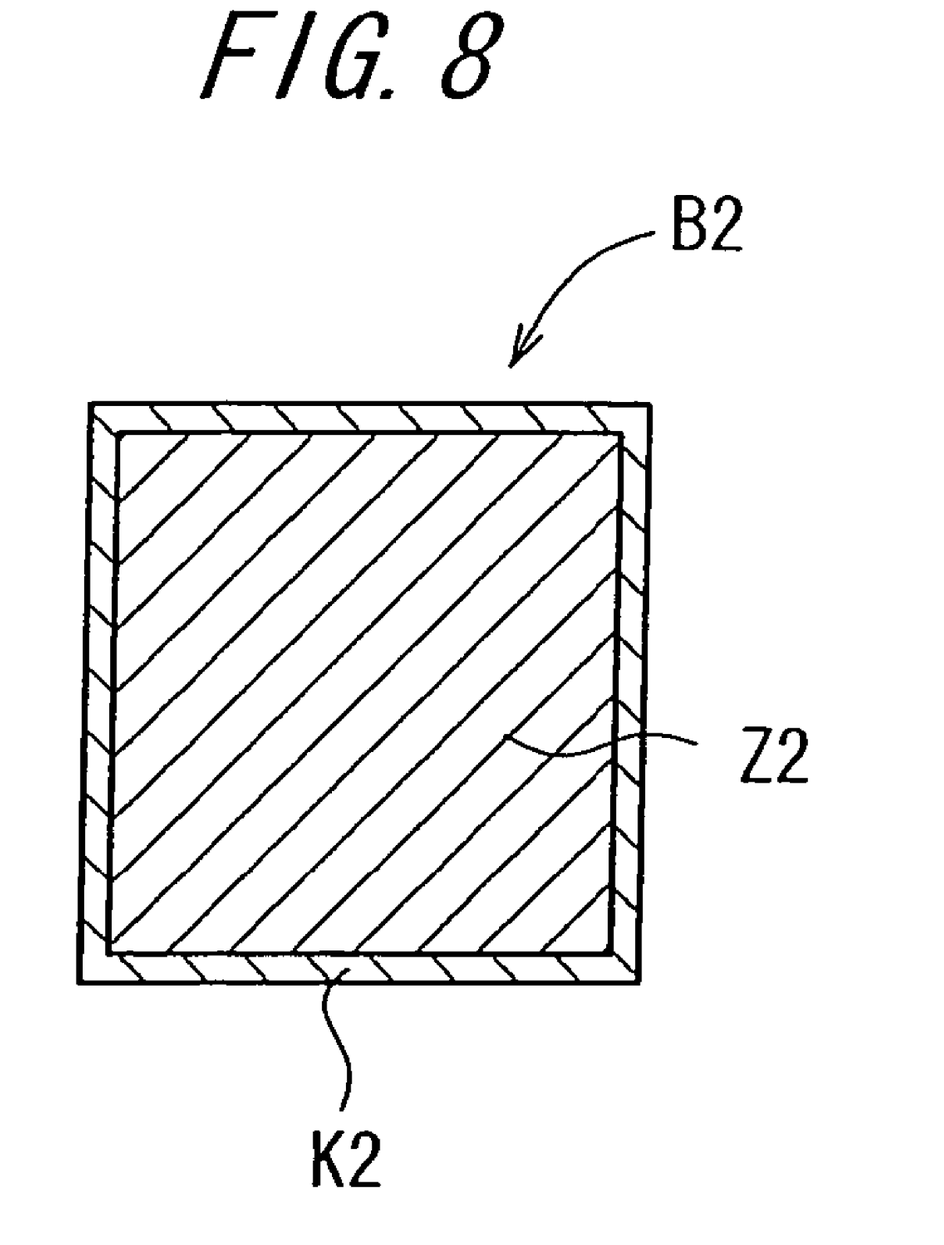
FIG. 8 is a cross-sectional view of the briquette for introduction into a slag generating apparatus shown in FIG. 7.

FIG. 7 is a perspective view illustrating schematically an embodiment of a briquette for introduction into a slag generating apparatus in accordance with the present invention. FIG. 8 is a cross sectional view thereof. The briquette B2 for introduction into a slag generating apparatus of the present embodiment is composed of a porous brittle molded body Z2 which as a whole has a round columnar shape and a reinforcing layer K2 serving as a reinforcing portion formed under the surface (inside) thereof.

The brittle molded body Z2 is obtained by compression molding a molding composition comprising a comminuted powder of used alumina grinding stones (component (a)), a cotton-like (fibrous) aggregate comprising grinding powders generated by grinding of ferrous metals and a grinding liquid comprising an oil fraction and a water fraction (component (b)), the compression molding being conducted so that the molded body has a round columnar shape and a bulk specific gravity of 1.5 or more, preferably within a range of 1.5 to 3.0. This brittle molded body Z2 is composed as a porous brittle body having appropriate cavities.

Alumina grinding stones that were used for grinding a variety of cast irons and steels and were planned to be treated as wastes are used as the aforesaid alumina grinding stones. Those alumina grinding stones are comminuted, for example, with a hammer, to obtain a comminuted powder. With the shape retention ability in view, the content ratio of the comminuted powder of the alumina grinding stones is preferably set within a range of 30 to 50 wt. % based on the entire molding composition prior to compression molding.

A ferrous metal containing not less than 0.2 wt. % carbon can be used as the aforesaid ferrous metal. Grinding powders of such a ferrous metal have a large springback and are difficult to solidify. However, employing compression molding makes it possible to eliminate the effect of springback during compression molding and effectively shear the grinding powders, thereby enabling solidification. Grinding powders of bearing steels represent an example of grinding powders containing not less than 0.2 wt. % carbon. The content ratio of grinding powders of a ferrous metal is preferably set within a range of 0.1 to 60 wt. %, more preferably 40 to 50 wt. % based on the entire composition of the molding prior to compression molding. If the amount of grinding powders is small, the shape is difficult to maintain even in the case of compression molding, for example, into a cylindrical columnar shape. Conversely, if the amount of grinding powders is large, the content ratio of the comminuted powder of alumina grinding stones becomes small.

The reinforcing layer K2 is formed in a layered manner with a strength and density higher than that of the inner portions (brittle molded body Z2) of the briquette B2. The reinforcing layer K2 can be formed, for example, by dipping in a liquid solidification adjuvant, or applying (coating) a liquid solidification adjuvant, followed by drying. Colloidal silica, sodium silicate, aluminum phosphate, asphalt emulsion and pulp sludge are preferably used as the solidification adjuvant. Using those materials makes it possible to obtain a strong briquette B despite the presence of the comminuted powder of alumina grinding stones or oil derived from the grinding liquid. Here, the pulp sludge contains a wood pulp, argillaceous clay, water, and the like and is an industrial waste discharged from papermaking plants. Therefore, the briquette B2 providing for even more effective utilization of resources and environmental protection can be provided. The aforesaid solidification adjuvants can be used individually or in combination of two or more thereof. The solidification adjuvant is preferably used at a ratio of 1 to 10 wt. %, especially preferably in a range of 5 to 10 wt. %, based on the entire briquette B.

Figure 9:
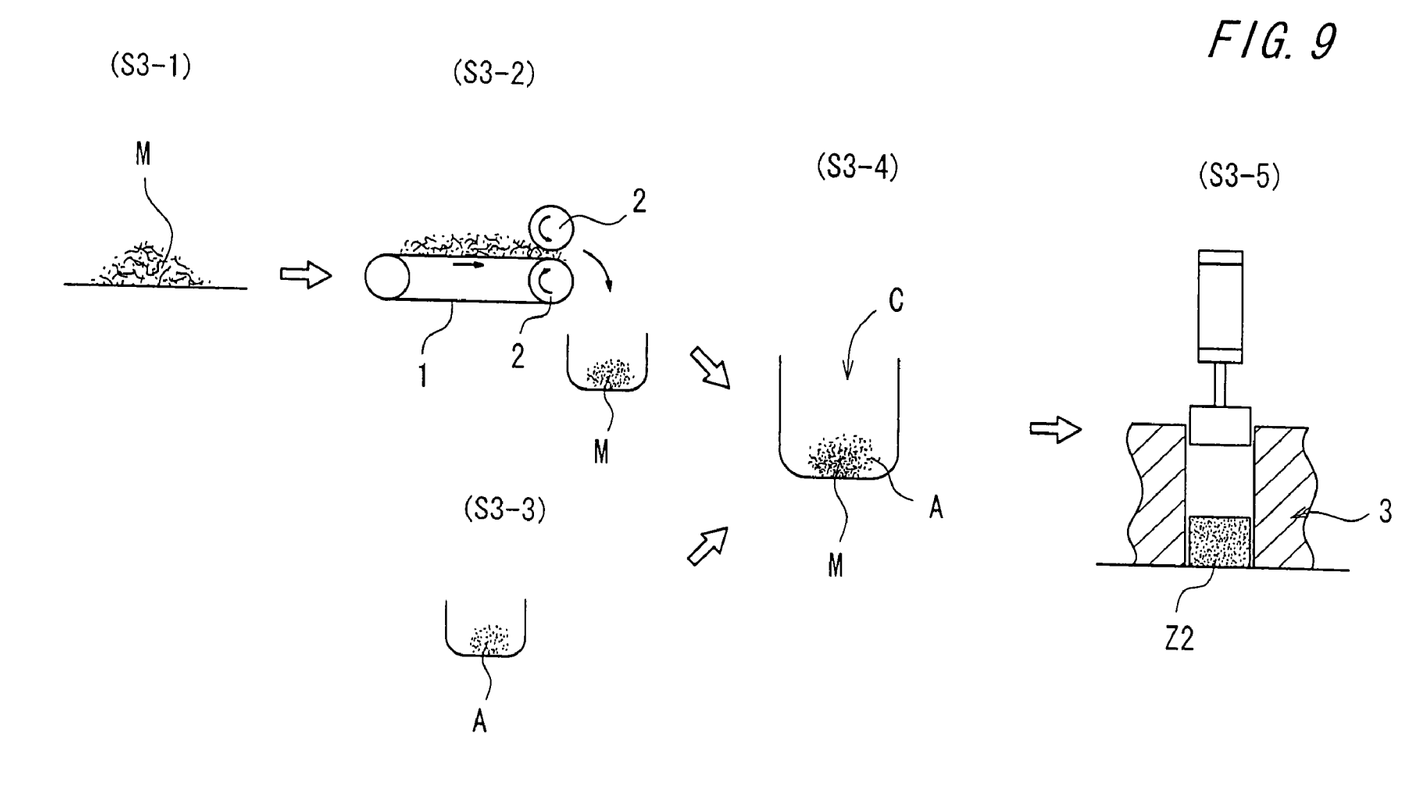
FIG. 9 is a process diagram illustrating schematically the process (before compression molding) for the manufacture of the briquette for introduction into a slag generating apparatus shown in FIG. 7.

The briquette B2 of the present embodiment can be manufactured, for example, in the manner as follows. Thus, first, as shown in FIG. 9, cotton-like aggregates M comprising grinding powders of a ferrous metal and a grinding liquid (see S3-1 in the figure) are pressurized and compressed by passing between a pair of rolls 2, while being transported on a belt conveyor 1 (see S3-2 in the figure), thereby preliminary adjusting the content of water and oil which are the components of the grinding liquid contained in the cotton-like aggregates M. However, this adjustment of oil and water content can be also carried out by simple air blowing or air compression. In this process, the content ratio of water in the cotton-like aggregate M is preferably adjusted to a range of not more than 50 wt. % and the content ratio of oil is adjusted to a range of not more than 10 wt. %. As a result, the cotton-like aggregate can be easily handled, e.g., transported and stored.

On the other hand, used alumina grinding stones are comminuted, for example, with a hammer to obtain a comminuted powder A (see step S3-3 in the figure). The comminuted powder A of used alumina grinding stones and the aforesaid cotton-like aggregates M with the adjusted content of water and oil are mixed at the prescribed ratio to obtain a mixture C as a molding composition (see step S3-4 in the figure).

The mixture C thus obtained is then compression molded with a hydraulic press by using a mold 3 and a brittle molded body Z2 is obtained (see S3-5 in the figure). In this process, the cotton-like aggregates M are compressed so that the bulk specific gravity of the brittle molded body Z2 becomes 1.5 or higher. As a result of his compression molding, the grinding powders in the form of spiral fibers that are contained in the cotton-like aggregates M are subjected to shear deformation, and the comminuted powder A of alumina grinding stones is introduced in the gaps between the sheared grinding powders. Further, a mechanical pressurizing machine using a ball screw or the like may be also used.

Figure 10:
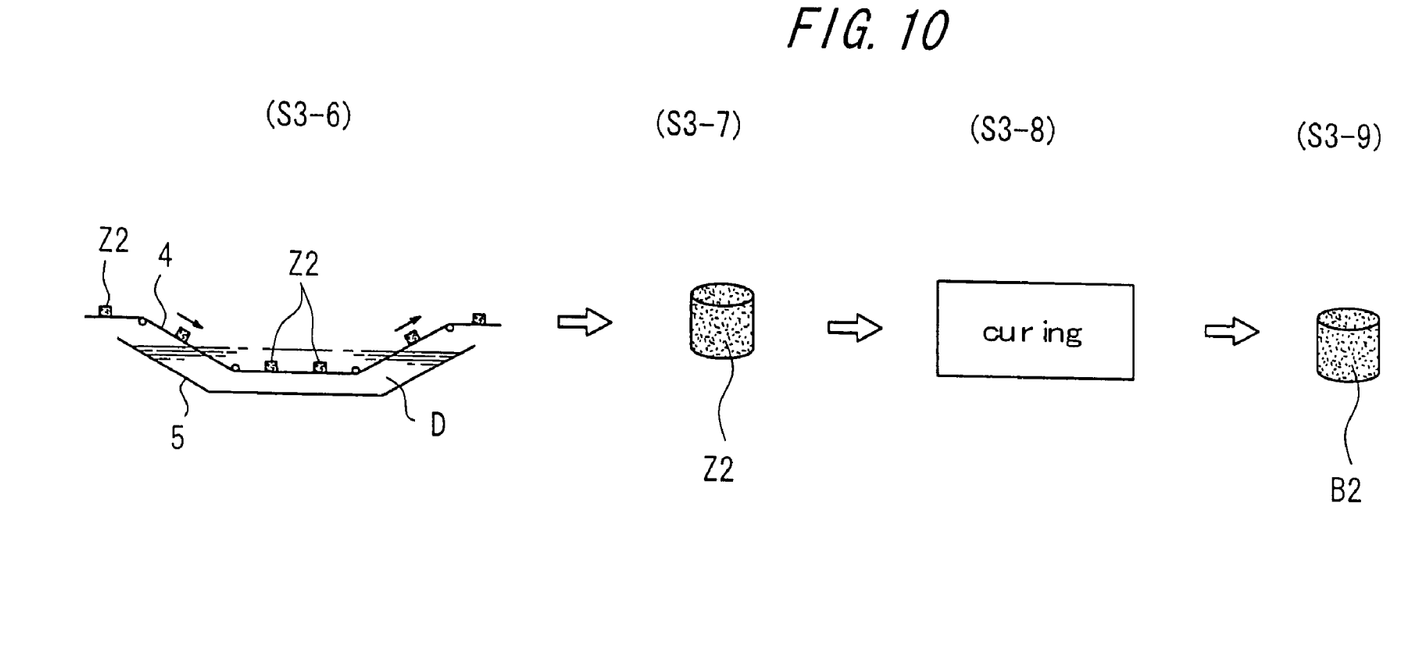
FIG. 10 is a process diagram illustrating schematically the process (after compression molding) for the manufacture of the briquette for introduction into a slag generating apparatus shown in FIG. 7.

Then, as shown in FIG. 10, the brittle molded body Z2 thus obtained is immersed in a liquid solidification adjuvant D that was poured in a tank 5, while being slowly transported on a belt conveyor 4, so as to prevent the brittle molded body from crushing (see S3-6 in the figure). Instead of transporting on the conveyor, the brittle molded body Z2 may be accommodated in a pallet or the like and immersed in the liquid solidification adjuvant D in a batch mode.

A briquette B2 can be then obtained (see S3-9 in the figure) by curing (drying) (see S3-8 in the figure) the brittle molded body Z2 (see S3-7 in the figure) impregnated with the solidification adjuvant D. As a result of the curing, excess solidification adjuvant that penetrated into the brittle molded body Z2 migrates to the surface and is partly evaporated. The rest of the solidification adjuvant remains on the surface of the brittle molded body Z2, thereby forming a reinforcing layer K2 that makes a strength and density on the surface higher than those inside. The target briquette B2 is thus obtained.

The briquette B2 of the present invention that was thus obtained uses a comminuted powder of used alumina grinding stones and a cotton-like aggregate comprising grinding powders of a ferrous metal and a grinding liquid. Moreover, because the reinforcing portion is formed, the prescribed strength and shape retention ability are ensured. Moreover, because the comminuted powder of used alumina grinding stones (component (a)) is contained, good slag flowability is obtained when the briquettes are introduced into a slag generating apparatus such as a blast furnace. In addition, because the briquettes can be used instead of the conventional slag flowability modifiers or calming agents for blast furnaces or together therewith, used alumina grinding stones can be reused effectively, and because the amount of used alumina grinding stones that have to be processed as wastes is reduced, environment is protected. Furthermore, because a dried solid substance of prescribed dimensions (for example, round columns with a diameter of 40 to 70 mm and a height of 30 to 50 mm) is obtained, scattering and whirling are prevented even when the briquettes are introduced into a slag generating apparatus and such inconvenience as the unstable state of briquettes inside the unit is prevented.

In addition to the aforesaid round columnar shape, the briquette B2 for introduction into a slag generating apparatus in accordance with the present invention may have a shape with rounded edges, such as egg-like, almond-like, or rugby ball-like shape or a pillow-like shape in which the thickness gradually increases from the edges to the center. Molding to such a shape increases the resistance to a compression load, crushing, and partial fracture in the corner portions.

The briquette for introduction into a slag generating apparatus in accordance with the present invention is not limited to a configuration in which the reinforcing layer K2 is formed under the surface of the porous brittle molded body Z2. For example, a reinforcing layer may be also formed under the surface and on the surface of the brittle molded body Z2, for example, by applying (coating) a solidification adjuvant having a high viscosity on the surface of the brittle molded body Z2, thereby reducing the degree of permeation into the porous brittle molded body Z2. Furthermore, a reinforcing layer may be formed on the surface of the brittle molded body Z2 by using a solidification adjuvant with even higher viscosity and substantially eliminating the permeation into the porous brittle molded body Z2. With such briquettes, too, introduction into a slag generating apparatus can improve the slag flowability. As a result, a contribution is made to the effective utilization of resources and environmental protection.

The briquette for introduction into a slag generating apparatus in accordance with the present invention may be also manufactured, for example, by introducing a solidification adjuvant in advance into the molding composition, compression molding the molding composition and then curing (drying). In this case, a state is assumed in which the solidified solidification adjuvant that remained in the brittle molded body is distributed appropriately and becomes a reinforcing portion for reinforcing the brittle molded body. Such a briquette, similarly to the above-described briquettes, is ensured to have the appropriate strength and shape retention ability. Furthermore, flag flowability can be improved. Therefore, this method is preferred from the standpoint of effective utilization of resources and environmental protection.

What is claimed is:

1. A briquette for introduction into a slag generating apparatus, comprising:
   a porous brittle molded body obtained by compression molding a molding composition comprising the following components (a) and (b); and
   a reinforcing portion comprising a solidification adjuvant for reinforcing the brittle molded body which is a reinforcing layer formed in a layered manner only on and/or under a surface of the brittle molded body, said reinforcing layers being formed by immersing the brittle molded body in liquid solidification adjuvant,
   (a) a comminuted powder of a used alumina grinding stone; and
   (b) a cotton-like aggregate comprising a grinding powder of a ferrous metal and a grinding liquid.

2. The briquette for introduction into a slag generating apparatus, according to claim 1, wherein said reinforcing portion is a reinforcing layer formed in a layered manner on at least one location of under the surface and on the surface of said brittle molded body.

3. The briquette for introduction into a slag generating apparatus, according to claim 1, wherein said reinforcing portion comprises a solidification adjuvant.

4. The briquette for introduction into a slag generating apparatus, according to claim 3, wherein said solidification adjuvant is at least one selected from a group including colloidal silica, sodium silicate, aluminum phosphate and asphalt emulsion.

5. The briquette for introduction into a slag generating apparatus, according to claim 3, wherein said solidification adjuvant is a pulp sludge.

6. The briquette for introduction into a slag generating apparatus, according to claim 1, wherein the content ratio of a grinding powder of a ferrous metal in said molding composition is set within a range of 1 to 60 wt. %.

7. A process for making a briquette for introduction into a slag generating apparatus comprising:
   compression molding a molding composition comprising
      (a) a comminuted powder of a used alumina grinding stone, and
      (b) a cotton-like aggregate comprising a grinding powder of a ferrous metal and a grinding liquid
   to form a porous brittle molded body,
   immersing the porous brittle molded body into a liquid solidification adjuvant to thereby form a reinforcing layer in a layered manner only on and/or under a surface of the brittle molded body.

* * * * *